United States Patent [19]

Morimoto et al.

[11] Patent Number: 4,758,977

[45] Date of Patent: Jul. 19, 1988

[54] ELECTRONIC DICTIONARY WITH GROUPS OF WORDS STORED IN SETS AND SUBSETS WITH DISPLAY OF THE FIRST AND LAST WORDS THEREOF

[75] Inventors: Masafumi Morimoto, Yamatokoriyama; Ken Sawada, Ikoma, both of Japan

[73] Assignee: Sharp Kabushiki Kaisha, Osaka, Japan

[21] Appl. No.: 873,860

[22] Filed: Jun. 11, 1986

Related U.S. Application Data

[63] Continuation of Ser. No. 508,161, Jun. 27, 1983, abandoned.

[30] Foreign Application Priority Data

Jun. 30, 1982 [JP] Japan ................................ 57-114466

[51] Int. Cl.$^4$ ..................... G06F 15/38; G06F 3/14; G06F 12/00
[52] U.S. Cl. ........................... 364/900; 364/419
[58] Field of Search ... 364/200 MS File, 900 MS File, 364/419

[56] References Cited

U.S. PATENT DOCUMENTS

| 4,301,511 | 11/1981 | Shimizu et al. | 364/709 |
|---|---|---|---|
| 4,328,562 | 5/1982 | Hashimoto et al. | 364/900 |
| 4,354,232 | 10/1982 | Ryan | 364/200 |
| 4,367,537 | 1/1983 | Yoshida | 364/900 |
| 4,417,319 | 11/1983 | Morimoto et al. | 364/900 |
| 4,467,446 | 8/1984 | Sakurai | 364/419 X |
| 4,481,607 | 11/1984 | Kobayashi et al. | 364/900 |
| 4,509,137 | 4/1985 | Yoshida | 364/419 X |

FOREIGN PATENT DOCUMENTS 7846729  8/1979  United Kingdom ............... 364/900

OTHER PUBLICATIONS

"A Primer" on Lexpat; 1980, published by Mead Data Central; pp. 4–5.
"A Quick Reference" on Lexpat; 1982, published by Mead Data Central.

Primary Examiner—Raulfe B. Zache
Assistant Examiner—Thomas C. Lee
Attorney, Agent, or Firm—Birch, Stewart, Kolasch & Birch

[57] ABSTRACT

A memory circuit for an electronic dictionary or translator is provided for storing some number of entry words by grouping them into some groups for including a substantially same number of entry words. A group selection means is provided for selecting a specific group, such that the selected group of entry words are outputted subsequently, so that a specific entry word is selected.

14 Claims, 4 Drawing Sheets

ELECTRONIC DICTIONARY WITH GROUPS OF WORDS STORED IN SETS AND SUBSETS WITH DISPLAY OF THE FIRST AND LAST WORDS THEREOF

This application is a continuation, of application Ser. No. 508,161 filed on June 27, 1983, now abandoned.

BACKGROUND OF THE INVENTION

The present invention relates to an electronic dictionary and, more particularly, to an electronic portable dictionary or translator.

Recently, electronic devices called electronic dictionaries or translators have become available on the market. Since such electronic devices require efficient and rapid retrieval of word information stored in a memory, it may be desired that rapid input of entry word selection information be incorporated in such devices.

In this aspect, an entry word selection system has been presented as disclosed in Isamu Washizuka, U.S. Ser. No. 414,921, filed on Sept. 3, 1982, assigned to the present assignee, entitled "POCKET ELECTRONIC TRANSLATOR". In this system, entry words are retrieved in turn by selecting a first and a second letter of each of the entry words to be selected. However, such system is disadvantageous in that, when the number of the entry words starting with similar first and the second letters is very great, the retrieval time for a specific word among the entry words may be too long.

SUMMARY OF THE INVENTION

Accordingly, it is an object of the present invention to provide an improved electronic language dictionary or translator for enabling rapid input of entry word selection information into the dictionary or translator.

It is another object of the present invention to provide an improved input device for an electronic dictionary or translator for inputting entry word selection information to be retieved from a memory with relatively few operations of an input key means.

It is a further object of the present invention to provide an improved memory means for an electronic dictionary or translator for storing a plurality of entry words and for dividing the words into several groups, each group containing the same number of entry words, whereby an individual group is selected by group selection means to output specific entry words.

Briefly described, in accordance with the present invention, a memory circuit for an electronic dictionary or translator is provided for storing a plurality of entry words by grouping them into several groups, each group including up to the same number of entry words. A group selection means is provided for selecting a specific group, such that the entry words of the selected group are outputted subsequently, whereby a specific entry word from the entry words can be selected, at a rapid rate.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
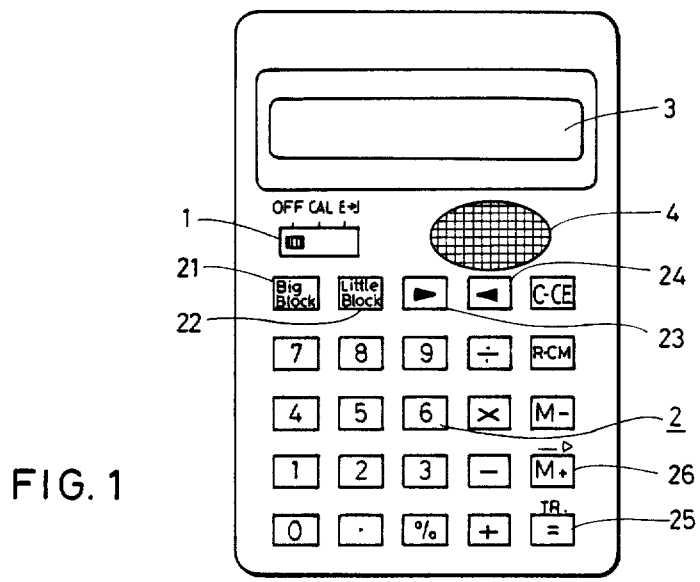
FIG. 1 shows a plan view of an electronic translator according to the present invention.

FIG. 1 shows an electronic translator according to the present invention. Although the apparatus of FIG. 1 is an electronic translator for translating one or more first words in a first language into one or more second words in a second language, it may be possible that another type of dictionary including an electronic language dictionary for outputting word description data in a language in response to the input of one or more entry words in the same language can be used.

The electronic translator of FIG. 1 performs as an electronic calculator and an electronic translator for translating English to Japanese and vice versa.

The electronic translator of FIG. 1 comprises a mode selector 1, a keyboard 2, a display 3, and a speaker 4.

The keyboard 2 comprises a big block forward search key 21, a little block forward search key 22, an entry word forward search key 23, a backward search key 24, a translation key 25, and a display switching key 26.

One feature of the translator of the present invention is that a specific entry word can be outputted from one of the big blocks including a plurality of little blocks. Each of 20 big blocks is provided for storing any number of English words less than 500, so that the total number of the English words stored in the English alphabetical order is 10,000.

Each time the big block selection key is actuated, each of the pairs of leading words and final words of the selected big blocks are outputted in turn.

Each of the big blocks includes 20 little blocks containing 25 English words or less. Each time a little block selection key is actuated, a leading word and a final word are outputted in turn which are stored in each of the little blocks among the selected big block. When a desired little block is selected and each time the entry word forward search key 23 is actuated, the entry words are subsequently retrieved from the selected little block.

All the entry words are aligned in English or Japanese alphabetical order or a 0-9 order. The number of the words of each of the blocks is substantially common to all blocks. Specific entry words are retreived by selecting a desired block. All the entry words can be retrieved with a short and common access time.

The mode selector 1 slides to select one of a power off mode, a calculator mode, and an English to Japanese translation mode labeled "E→J" in FIG. 1.

Since the keyboard 2 includes conventional key switches as the calculator, they can be actuated for this purpose when the calculator mode is selected.

In the English to Japanese translation mode, the big block forward search key 21 is repetitively actuated to select one of the 20 big blocks by looping all the 20 big blocks in a manner of "the first one-the second one . . . . -the twentieth one - the first one-".

The little block forward search key 22 is actuated to select one of the little blocks of the selected big block. Once the big block is selected and each time this little block forward search key 22 is actuated, a subsequent one little block is selected from the first little block. After the final little block in the selected big block is selected, the first little block in the big block is reselected by actuating this key 22.

If no big block is selected and the little block forward search key 22 is actuated, the first little block and its subsequent little blocks of the first big block and of its subsequent big blocks are selected in turn.

After one little block is selected and each time the entry word forward search key 23 is actuated, the first word and its subsequent words to the last word of this little block are outputted and displayed in turn. After one big block is selected and each time the entry word forward search key 23 is actuated, the first word and its subsequent words to the last word of this big block are outputted and displayed. Thus, regardless of whether the big blocks or the little blocks are selected, the entry word forward search key 23 is actuated to output and display the first word and its subsequent words to the last word of this block, in turn.

The backward search key 24 is operated as follows:
1. Before the little block forward search key 22 is actuated, the backward search key 24 is actuated to search in reverse order through the big blocks.
2. After the little block forward search key 22 is actuated and before the entry word forward search key 23 is actuated, the backward search key 24 is actuated to search in reverse order through the little blocks.
3. After the entry word forward search key 23 is actuated, the backward search key 24 is actuated to search in reverse order through the entry words.
4. When the big block forward search key 21 is not actuated, the backward search key 24 is actuated to search in reverse order through the big blocks starting from the last big block.
5. When the big block has been selected, the backward search key 24 is actuated to back up to the previous big block so that when the first big block is reached, the last and twentieth big block is selected.
6. When the big block has been selected and the little block forward search key 22 is actuated to select one little block, the backward search key 24 is repetitively actuated to select one little block preceding the little block by one, subsequently. After the first little block of the selected big block has been selected, the last little block of the same big block is selected.
7. When one little block has been selected and the entry word forward search key 23 is actuated to select one entry word, the backward search key 24 is actuated to back the entry word by one for selection, in which, when the first entry word of the little block is selected, the last entry word of the same little block is selected.

All the block keys 21 and 22, the entry word forward search key 23, and the backward search key 24 can be operated continuously to enable search of the blocks or the words with one or more predetermined intervals.

The translation key 25 is actuated to translate one or more English words into one or more Japanese words. The display switching key 26 is actuated to switch to display the latter part of the display when the former part of the display exceeds the number of digits in the display 3.

The display 3 can show the first word and the last word once one block is selected by actuating the block selection keys 21 and/or 22. The speaker 4 is operated to speak this first word and this last word with a voice synthesizer. When the entry word forward search key 23 is actuated to select one entry word, the display 3 shows the entry word and the speaker 4 communicates the entry word.

Figure 2:
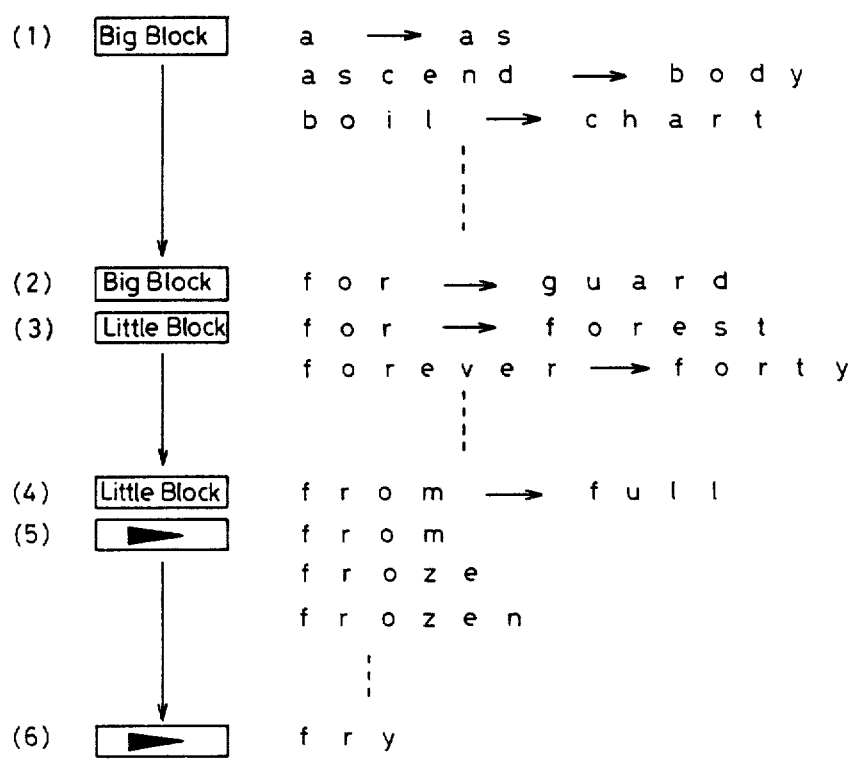
FIG. 2 shows search examples related between key switches operated and display examples.

FIG. 2 shows a relationship between the key operations and the display examples when an English word "fry" is to be searched and selected as an entry word.

FIG. 2-(1): The big block forward search key 21 is continuously operated to subsequently select the big blocks in turn in which each of pairs of the first words and the last words of the presently selected big blocks are displayed. Further, it is shown that the first big block contains 500 words starting with "a" and ending with "as", and the second big block contains another set of 500 words starting with "ascend" and ending with "body".

FIG. 2-(2): Finally, it is shown that the eighth big block contains 500 words starting with "for" and ending with "guard", in which the word "fry" should be contained. At this stage, the actuation of the big block forward search key 21 is released.

FIG. 2-(3): The little block forward search key 22 is repetitively actuated to subsequently retrieve the little blocks of the eighth big block, in which each of the pairs of the first words and the last words of the littel blocks are displayed. It is further shown that the first little block of the eighth big block contains 25 words starting with "for" and ending with "forest" and the second little block thereof contains 25 words starting with "forever" and ending with "forty".

FIG. 2-(4): It is further shown that the fourth little block contains 25 words starting with "from" and ending with "full", in which the word "fry" should be contained. At this stage, the actuation of the little block forward search key 22 is released.

FIG. 2-(5): The entry word forward search key 23 is continuously actuated to subsequently retrieve the entry words in this fifth little block.

FIG. 2-(6): Once the entry word "fry" is displayed by actuating the entry word forward search key 23, the actuation of this key 23 is released. Thus, the word "fry" is selected as an entry word.

The translation key 25 may be actuated to translate this word "fry", so that a translated word can be retrieved from the memory and displayed in the display 3.

Figure 3:
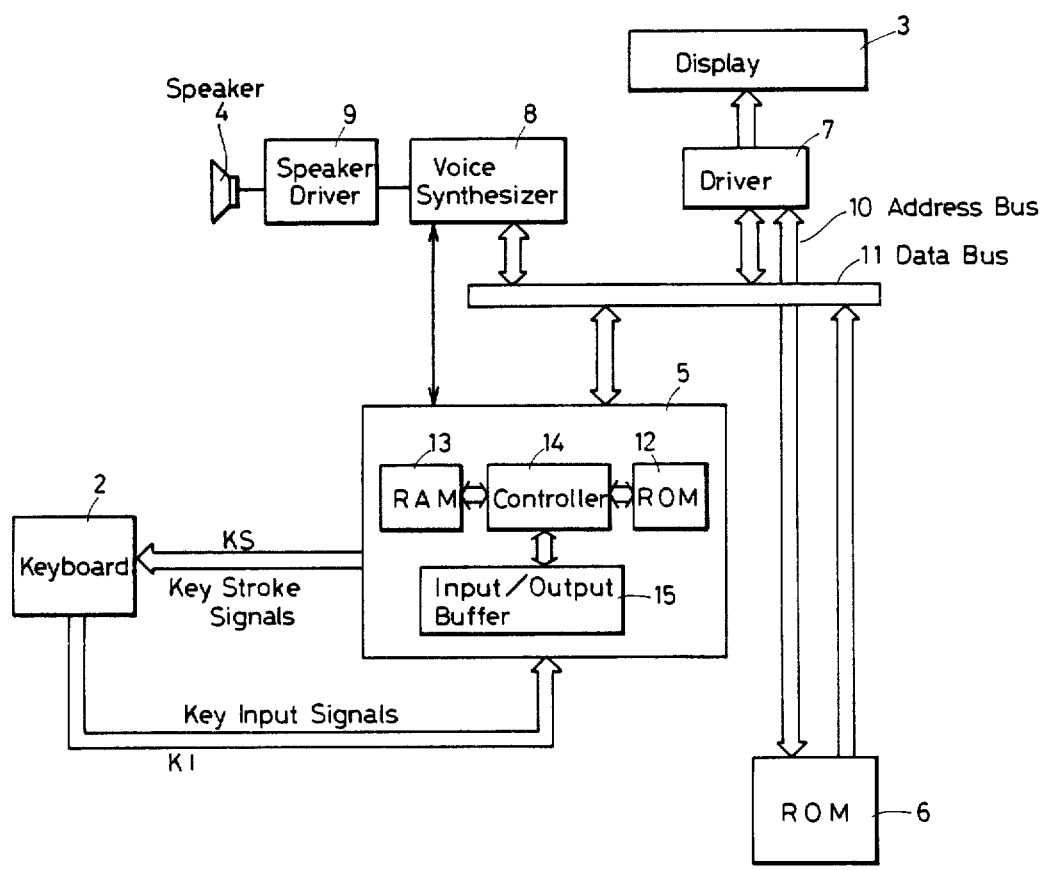
FIG. 3 shows a block diagram of a circuit implemented within the electronic translator of FIG. 1.

FIG. 3 shows a block diagram of a circuit implemented within the translator of FIG. 1.

The circuit of FIG. 3 comprises the keyboard 2, the display 3, the speaker 4, a microprocessor 5, a ROM 6, a driver 7, a voice synthesizer 8, and a speaker driver 9. An address bus 10 and a data bus 11 are also provided.

The microprocessor 5 develops key strobe signals KS toward the keyboard 2 and receives key input signals KI from the keyboard 2 to detect the key input operations of the key switches of the keyboard 2. The microprocessor 5 selects an address of the ROM 6 to read in the contents of the addresses of the ROM 6.

The microprocessor 5 comprises a ROM 12, a RAM 13, a controller 14, and an input/output buffer 15. An inner bus is provided for interconnecting these elements. The ROM 12 stores a control program for causing the operation of the translator according to the present invention. The RAM 13 fuctions as registers, flags, counters etc. for the operation according to the present invention. The controller 14 serves to control calculation operations.

The ROM 6 stores a great number of English words and the translated Japanese words used for the English to Japanese translation mode.

The driver 7 is responsive to display pattern information provided by the microprocessor 5 for controlling illumination of the digits in the display 3. The driver 7 comprises a memory means (RAM) for storing display and erase information corresponding to the digits of the display 3. Once some display information is set into the memory means of the driver 7 by the microprocessor 5, the driver 7 continues to develop the set display information toward the display 3 before new display information is set by the microprocessor 5.

The voice synthesizer 8 is responsive to voice word information from the microprocessor 5 for synthesizing the voice word information and outputting it to the speaker driver 9, so that the speaker 4 communicates the word. The voice synthesizer 8 includes a voice memory for storing the voice word information which forms and synthesizes the word.

Figure 4:
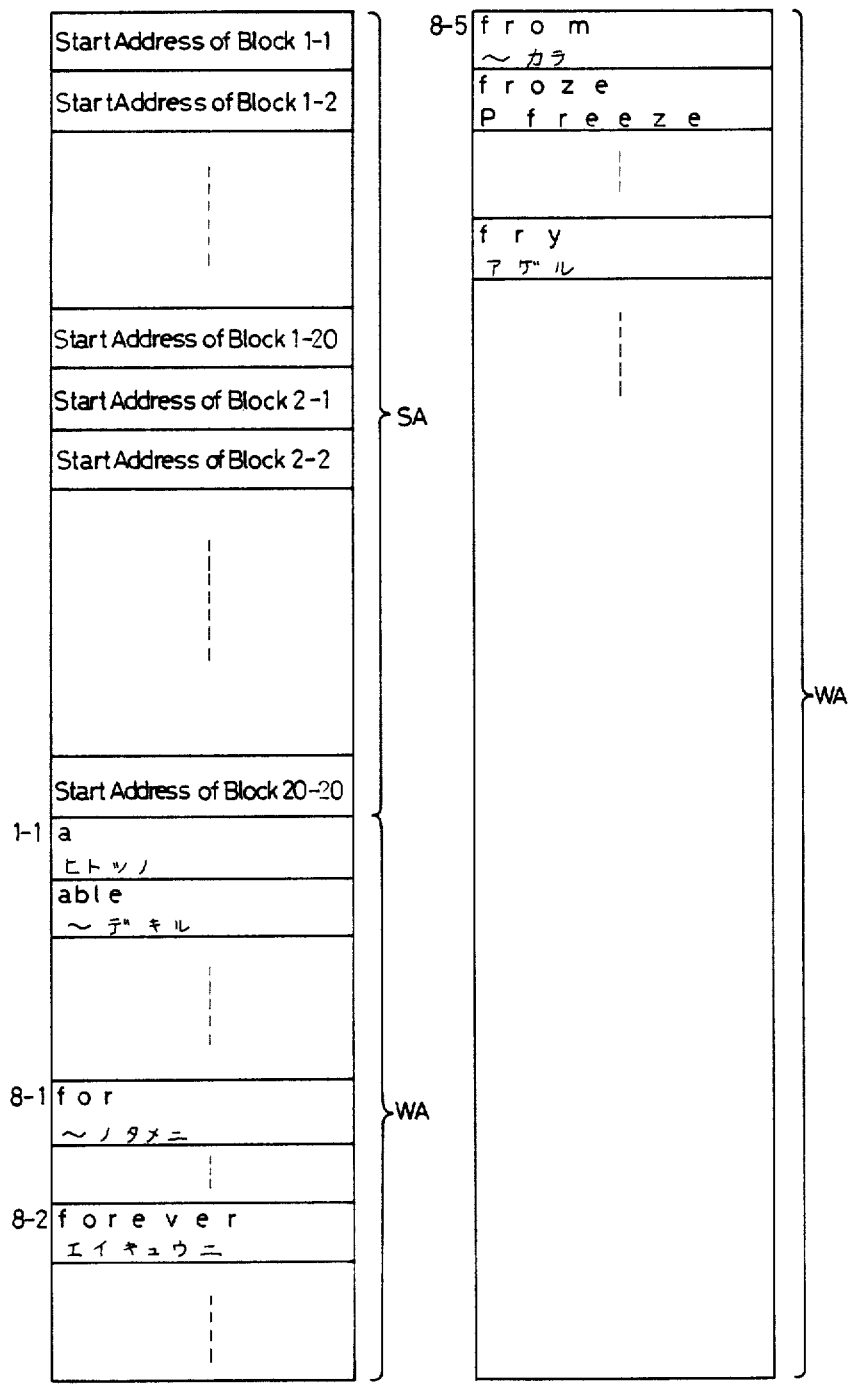
FIGS. 4(1) and 4(2) show the formats of a memory connected in the circuit of FIG. 3.

FIGS. 4(1) and 4(2) show the format of the ROM 6 in the circuit of FIG. 3.

The memory addresses of the ROM 6 are a word region WA for storing English and Japanese words, and a starting address region SA for storing starting addresses of the little blocks.

The word region WA stores 10,000 English words in the English alphabetical order and their Japanese words following the respective English words. According to the preferred embodiment of the present invention, the 10,000 English words are divided into the 20 big blocks each storing English words less than 500. Further, the 500 English words of the big block are divided into the 20 little blocks each storing less than 25 English words.

It should be noted in FIGS. 4(1) and 4(2) that a pair of an English word and a Japanese word are regarded as one entry word data since each pair are coupled in the storage data. Further, in FIG. 4(1), for example, block 1-2 means that the big block is "1" and the little block is "2".

The starting address region SA stores the starting addresses of the little blocks.

Figure 5:
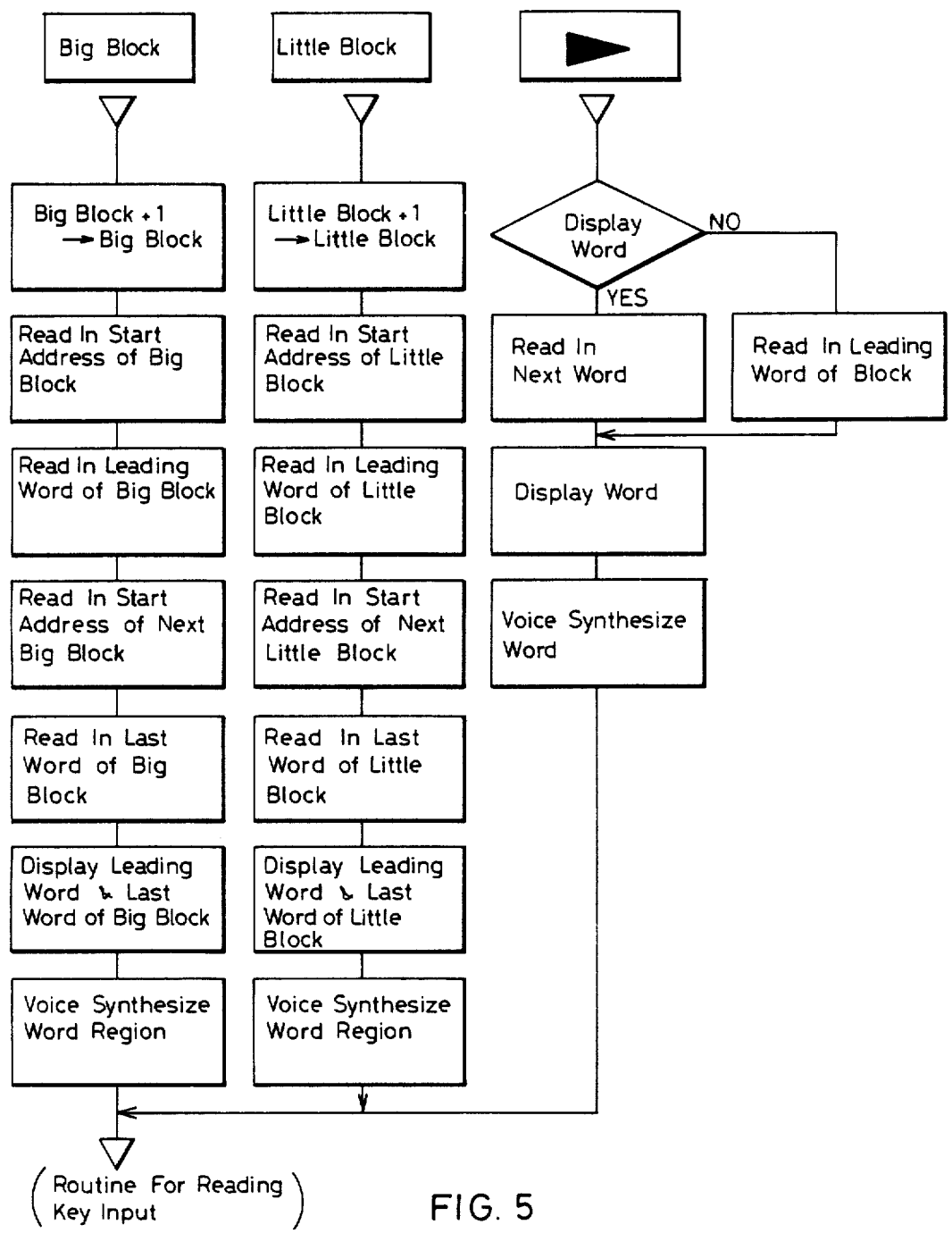
FIG. 5 shows a flow chart of the operation of the electronic translator according to the present invention.

FIG. 5 shows a flow chart of the operation of the translator of FIG. 1 caused by the program as stored in the ROM 12 of the microprocessor 5.

Big block search mode:

When the big block forward search key 21 is actuated, a big-block counter formed in the RAM 13 is incremented by one, so that the starting address corresponding to the new contents of the big-block counter is read in. The leading word is outputted having this starting address.

The starting address of the next big block is read in, so that the word preceding the starting address is outputted, whereby the last word of the big block is retrieved.

The first word and the last word are displayed in the display 3, synthesized, and spoken by the speaker 4.

Little block search mode:

Similar operations as stated above are carried out by actuating the little block forward search key 22 to select one little block of the selected big block.

Entry word search mode:

After the desired block has been selected, the entry word forward search key 23 is actuated to retrieve and display, and, further, voice synthesize the first word of the block. Each time the entry word forward search key 23 is actuated, the entry words are subsequently developed, so that they are displayed in the display 3 and voice synthesized by the synthesizer 8.

According to the present invention, the English and the Japanese words to be grouped and stored can be replaced by any other information as far as this information can be classified into some groups. For example, the Chinese characters can be grouped based on the number of the strokes, so that a Chinese character dictionary can be provided. Further, historical events are grouped chronologically, so that a historical dictionary can be provided.

According to the present invention, all the information can be retrieved quickly.

While only certain embodiments of the present invention have been described, it will be apparent to those skilled in the art that various changes and modifications may be made therein without departing from the spirit and scope of the present invention as claimed.

What is claimed is:

1. An electronic dictionary and translator device for retrieving and translating one or more entry words in a first language into one or more words in a second language, comprising:

first memory means for storing a plurality of corresponding words in said first and second languages;

said first memory means including a plurality of first storage areas each corresponding to a predetermined set of words, each of said storage areas being divided into a plurality of second storage areas each corresponding to a predetermined subset of words, greater than one, wherein the predetermined subset of words in a second storage area is less than the predetermined set of words in a first storage area;

first selection means for selecting said plurality of first storage areas;

second selection means for selecting said plurality of second storage areas;

access means, responsive to the actuation of said first and second selection means, for accessing any one of said predetermined sets of words in said plurality of first storage areas, and for accessing any one of said predetermined subsets of words in said plurality of second storage areas, wherein said access means includes means for displaying the first and last words of each set or subset upon actuation of said first or second selection means respectively;

means for retrieving said entry word from any one of the accessed sets or subsets; and means for displaying said entry word in said first language prior to said translation thereof to a second language.

2. The dictionary and translator device according to claim 1, wherein each of said plurality of first storage areas contain up to an equal number of words.

3. The dictionary and translator device according to claim 1, wherein each of said plurality of second storage areas contain up to an equal number of words.

4. The dictionary and translator device according to claim 1, wherein said first and second selection means each include a forward search means for sequentially advancing through said plurality of first and second storage areas set by set and subset by subset respectively, and further comprising word search means for sequentially advancing through one of said plurality of selected sets or subsets word by word.

5. The dictionary and translator device according to claim 1, wherein said first and second selection means include a backward search means for sequentially reversing through said first and second storage areas set by set and subset by subset respectively, and for sequentially reversing through one of said plurality of selected sets or subsets word by word.

6. The dictionary and translator device according to claim 1, further including voice synthesizer means, responsive to said access means, for generating verbal pronunciations of said first and last displayed words.

7. An electronic dictionary for providing word information in response to actuation of the dictionary, comprising:
first memory means for storing a plurality of words therein;
said first memory means including a plurality of first storage areas each corresponding to a predetermined set of words each of said first storage areas being divided into a plurality of second storage areas each corresponding to a predetermined subset of words, greater than one, wherein the predetermined subset of words in a second storage area is less than the predetermined set of words in a first storage area;
first selection means for selecting said plurality of first storage areas;
second selection means for selecting said plurality of second storage areas;
access means, responsive to the actuation of said first and second selection means, for accessing any one of said predetermined sets of words in said plurality of first storage areas, and for accessing any one of said predetermined subsets of words in said plurality of second storage areas, said access means including means for displaying the first and last words of each set or subset upon actuation of said first or second selection means respectively; and
means for retrieving an entry word from any one of said predetermined sets of words.

8. A dictionary according to claim 7, further including means for displaying said entry word.

9. A dictionary according to claim 7, wherein each of said plurality of first storage areas contain up to an equal number of words.

10. A dictionary according to claim 7, wherein each of said plurality of second storage areas contain up to an equal number of words.

11. A dictionary according to claim 7, wherein said first and second selection means each include a forward search means for sequentially advancing through said plurality of first and second storage areas set by set and subset by subset respectively, and further comprising word search means for sequentially advancing through one of said plurality of selected sets or subsets word by word.

12. A dictionary according to claim 7, wherein said first and second selection means include a backward search means for sequentially reversing through said first and second storage areas set by set and subset by subset respectively, and for sequentially reversing through one of said plurality of selected sets or subsets word by word.

13. The dictionary according to claim 7, further including voice synthesizer means for generating verbal pronunciations of said first and last displayed words.

14. The dictionary according to claim 7, further including means for translating said entry word from a first language into a second language.

* * * * *